March 13, 1951 T. MOJONNIER ET AL 2,545,371
HEAT EXCHANGE RECEPTACLE
Filed Oct. 19, 1946 7 Sheets-Sheet 1

Inventors.
Timothy Mojonnier.
Oliver W. Mojonnier.
By Thomas H. Ferguson
Attorney.

Inventors.
Timothy Mojonnier.
Oliver W. Mojonnier.
By Thomas H. Fugman
Attorney.

March 13, 1951

T. MOJONNIER ET AL

2,545,371

HEAT EXCHANGE RECEPTACLE

Filed Oct. 19, 1946

Inventors
Timothy Mojonnier
Oliver W. Mojonnier
By Thomas H. Duguen
Attorney March 13, 1951  T. MOJONNIER ET AL  2,545,371
HEAT EXCHANGE RECEPTACLE Filed Oct. 19, 1946  7 Sheets-Sheet 6

Inventors
Timothy Mojonnier.
Oliver W. Mojonnier.
By Thomas H. Ferguson
Attorney.

March 13, 1951 T. MOJONNIER ET AL 2,545,371
HEAT EXCHANGE RECEPTACLE

Filed Oct. 19, 1946 7 Sheets-Sheet 7

Inventors.
Timothy Mojonnier.
Oliver W. Mojonnier.
By Thomas H. Fuqua Attorney.

Patented Mar. 13, 1951

2,545,371

UNITED STATES PATENT OFFICE 2,545,371

HEAT EXCHANGE RECEPTACLE

Timothy Mojonnier, Oak Park, and Oliver W. Mojonnier, River Forest, Ill., assignors to Mojonnier Bros. Co., a corporation of Illinois Application October 19, 1946, Serial No. 704,402

5 Claims. (Cl. 257—212)

The present invention relates to receptacles generally, and more particularly to receptacles or containers that are adapted to be heated or cooled by flowing a temperature modifying medium through channels in the walls of the receptacle.

One object of the invention is to produce a receptacle of the class described, which shall be smooth and reasonably clear of connections on its exterior and hence one which may be readily polished and kept in a first-class sanitary condition within and without.

Another object has to do with the formation of the channels through which the temperature conditioning medium flows, and particularly with the means for directing its flow from one channel, or set of channels, to the next, either in the end or side walls. Where the receptacle is vertical, this end wall forms the bottom of the receptacle.

Another object is to so construct the wall of the receptacle that the over-all thickness will be a minimum.

Other objects are to produce a receptacle capable of quick drainage, one which may be readily made up for heating or for cooling, one having a high velocity due to the great intimacy of contact of the product with the heating or cooling surfaces, and one which may be readily cleaned.

Other objects have to do with sanitation, economy of manufacture, efficiency in operation, replacement and repair of parts, and in details of construction not heretofore pointed out.

For a fuller understanding of the invention, reference should be had to the following detailed description taken in connection with the accompanying drawings, wherein a preferred embodiment, with several modifications, is illustrated, while for a measure of the invention, reference should be had to the appended claims.

In said drawings,

Fig. 23 is a fragmentary plan view similar to

Fig. 22, showing the corrugations similarly arranged, but divided into two zones;

Throughout these figures, like characters refer to like parts.

Referring to the drawings in detail, and at first more particularly to the form of the invention shown in Figs. 1 to 5, 7 to 9, and 11 to 13, inclusive, the receptacle comprises, in brief, an outer shell A, an inner shell B, preformed walls C and D adhering to the shell B, insulation E within the space between the shells A and B, and suitable inlet and outlet connections F and G.

The outer shell A comprises a peripheral wall 30, preferably of sheet steel or other like material. It may be variously shaped, but, in any event, provides sides and a bottom or end 31. The inner shell B comprises a similar wall 32 and bottom or end 33 somewhat smaller than the outer shell. Thus, in each instance, a surrounding wall is united to a bottom wall to complete the shell, the inner shell being adapted to hold the material to be treated.

The peripheral walls are preferably curved in any suitable way about an axis, with their ends brought together and secured together, as by welding. The region of the weld or like connection is shown by a line, as for example by the line 34, in the case of the inner shell B. Each peripheral wall is then secured to its bottom to complete the shell, as will be obvious.

The peripheral walls C and D may be variously formed. They comprise a sheet which is bulged at points and compressed at other points. The compressed points or regions or suitably secured to the base sheet, as by welding, soldering, brazing, etc. In the preferred construction, the bulges are in the form of ridges or elevations which are separated by straight-line depressions which form valleys between the ridges. Thus, a corrugated sheet may well serve as a preformed sheet.

In the case of the preformed wall C, a corrugated sheet 35 is used. See Figs. 7 and 11. It is given a length somewhat less than the length of the basic sheet 32 to which it is secured. In this form of the invention, this sheet is bent the hard way—that is, crosswise of the corrugations, and is secured along its valleys to the latter sheet, preferably by welding. Such a preformed sheet, it will be observed, provides a jacketing space in the form of a series of main conducting passages or ducts for the flow of the conditioning medium.

Referring to Figs. 7 and 11, 12 and 13, because of the shortness of the corrugated sheet 35, as compared with the sheet 32 to which it is attached, its ends do not come together, but terminate on opposite sides of an intervening space 36. The ends of the corrugation openings are closed by a strip 37 on each side of the space 36, which stands on edge against the base sheet 32. Cooperating with the strips 37, are terminal boxes 38 and cross-over or bridging member 39. The cross-over members 39 extend between certain of the corrugations of the corrugated member 35. The latter have their walls cut away to provide windows 40. These windows are closed by the members 39, one end abutting against the plate 37, and the other end being provided with a flange 41 which fits against the corrugations. These members 39 are secured in place, preferably by being welded to the corrugations and to the strip 37. In this form of the invention, these windows 40 are, in fact, slots or notches formed in the opposing ends of the corrugation sheet 35. The closing of each slot by the strip 37 completes the window. The bridging members span the spaces between the main passages to form end passages between the main passages.

Each of the boxes 38 comprises a base from which extend plain walls or flanges 43, 44, and a wall 45 having a curved edge fitted to a corrugation of the plate 35. When the box is fitted into place, it is secured, preferably by welding, to the strip 37 and to the corrugated sheet 35, as shown.

Thus, the corrugations, together with the base sheet, produce an enclosing jacket consisting of a series of jacketed channels for the receptacle. In certain forms of the invention, the corrugations are connected in pairs or multiples, thus providing multiple paths for the heating or cooling medium.

Figures 1, 2, 3:
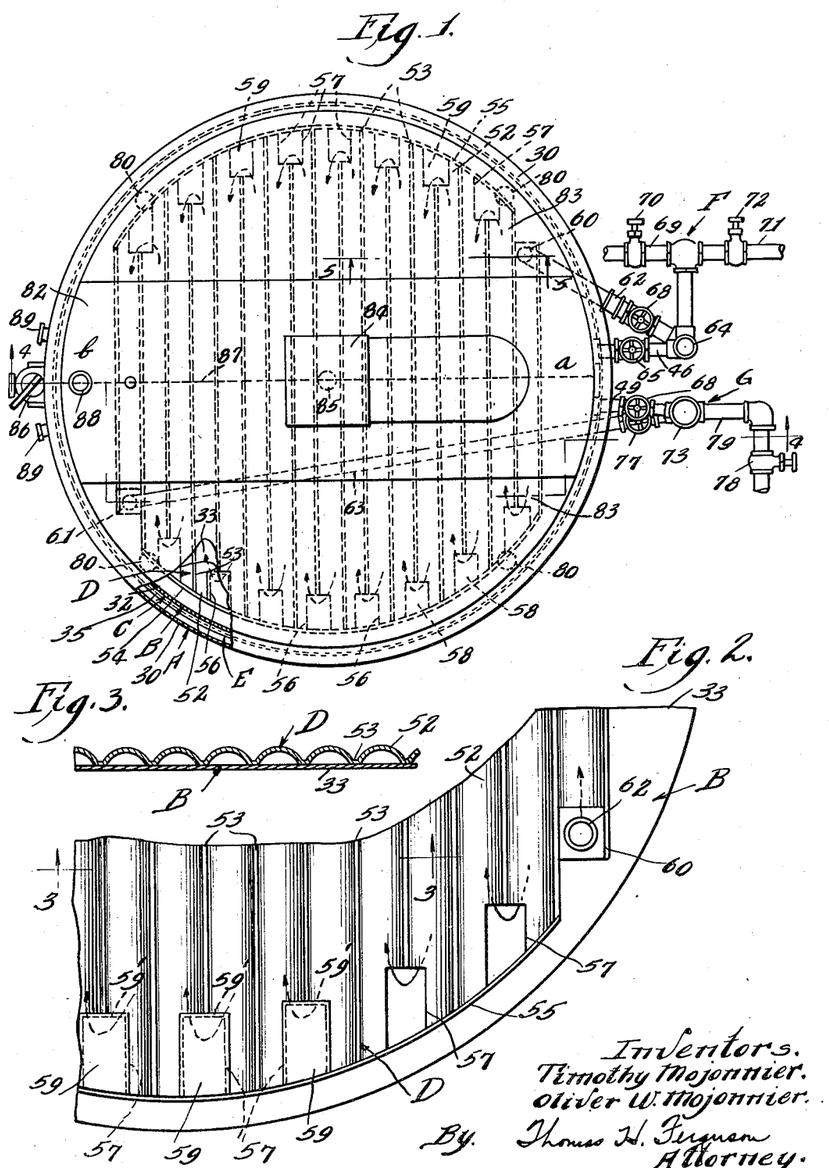
Fig. 1 is a plan view of a receptacle constructed and arranged according to the present invention, a portion of the same being broken away to show the construction more clearly.
Fig. 2 is a plan view of a fragmentary portion of the bottom plate, with the corrugations and a few of the bridging plates in place, inverted for clearness.
Fig. 3 is a transverse section of the turned-over plate and corrugations, the same being taken on a plane indicated by the line 3—3 of Fig. 2.
Figure 4:
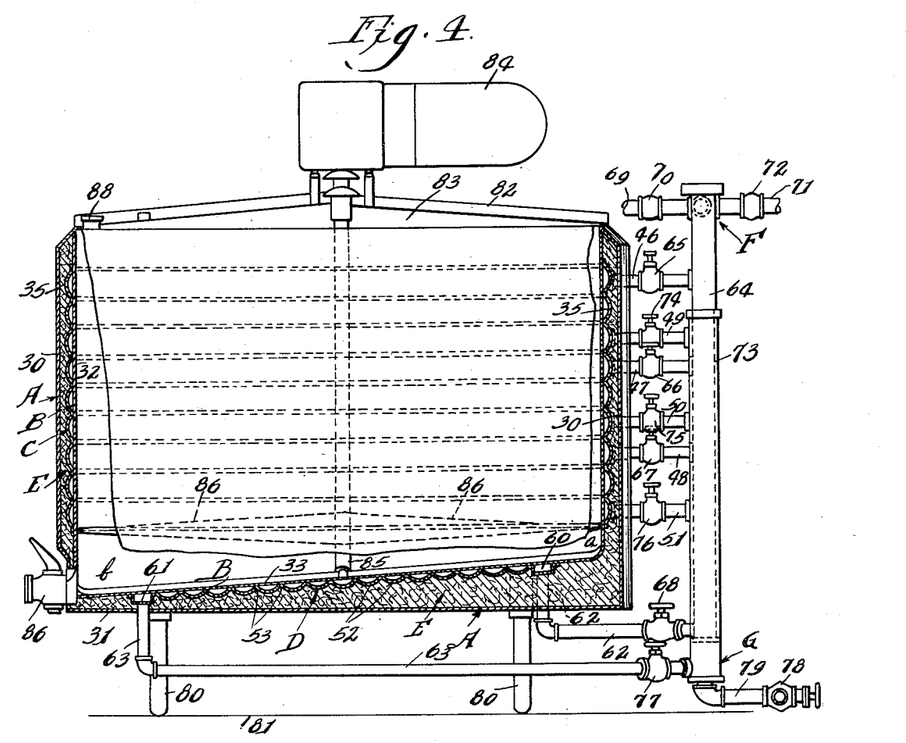
Fig. 4 is a cross-section of the receptacle, the plane of section being indicated by the irregular line 4—4 of Fig. 1.
Figure 11:
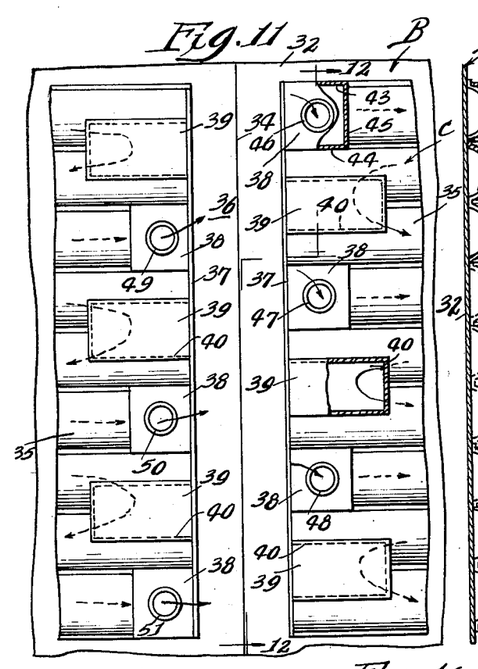
Fig. 11 is a fragmentary view showing, in partial elevation, the peripheral wall of Fig. 1, with the corrugations, bridging plates and outside connections.

In the zonal arrangement, shown particularly in Figs. 1, 4 and 11, these boxes 38 are pierced by inlet pipes 46, 47, 48, and outlet pipes 49, 50, 51. The inlet pipes 46, 47, 48, constitute part of the inlet connections F by which steam or other heating medium is supplied to the jacket, and the outlet pipes 49, 50, 51, form part of the outlet connections G by which the condensate is conducted away, as will appear more fully hereinafter. The different sets of pipes constitute the end pipes of the respective zones.

Figures 8, 9, 10:
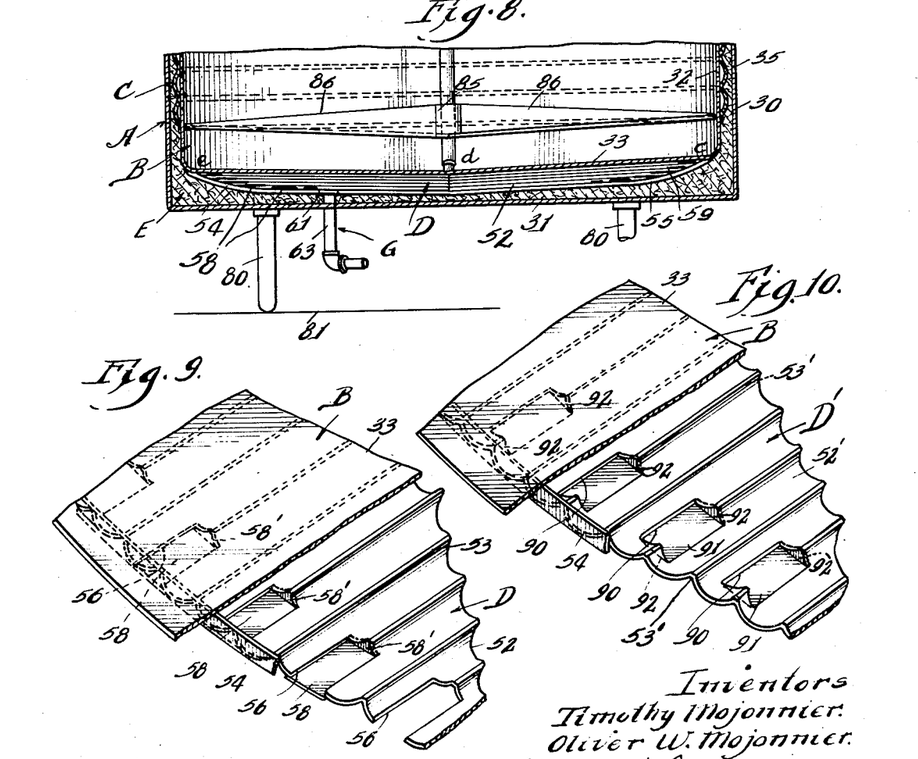
Fig. 8 is a central section similar to Fig. 7, showing the inclined bottom.
Fig. 9 is a fragmentary perspective view showing the make-up of this bottom.
Fig. 10 is a view similar to Fig. 9 showing modified cross-over plates.

Coming now to a consideration of the preformed wall D shown in Figs. 2, 8 and 9, a corrugated sheet 52 is provided, which is notched at its ends as shown. In this particular instance, there are seventeen corrugations and eight notches in each end, and the notches in the respective ends are in staggered relation to each other. The entire sheet is substantially circular to fit the bottom of the receptacle, which in this instance is cylindrical in form. Of course, it will be understood that the form of the receptacle may be varied and that the number of corrugations also may be changed to suit the formation intended.

The sheet 52, which is a corrugated sheet, is secured to the plain sheet 33 along its valleys 53 as shown in Fig. 3. At its ends it is bounded by two elongated metal strips 54, 55, as shown in Fig. 1, which are secured and sealed to it and the base sheet 33, preferably by welding. The elongated strips 54, 55, are, in each instance, outstanding from the base sheet, the same being secured thereto and sealed along their edges. Where the receptacle is vertical as shown, the strips 54, 55, project down from the sheet 33, which forms the bottom of the shell B, a depth approximating that of the bulges or the corrugations of the preformed sheet 52. The corrugations of the sheet 52, where they are cut away, are secured and sealed to the strips 54, 55, also preferably by welding.

The slots in the corrugated sheet 52 are designated 56 at one end or side, and 57 at the other, as shown in Fig. 1. They provide spaces or openings which extend transversely of the main passages and combine with the strips to provide a path for the temperature conditioning medium which flows through the interiors of the corrugations.

The series of notches 56 differ among themselves slightly because of the different angles at which the strips meet them. Thus, those corrugations which meet the strip more acutely are those toward the end of the strip. The same is true of the notches 57 at the other end of the sheet 52.

The openings or apertures 56, 57 are thus each formed by cutting away a portion of the corrugation ridges, by parallel cuts extending lengthwise of the corrugation ridges a substantial distance inward from the corrugation ends and then crosswise to complete the openings.

The slots or openings 56, 57, Fig. 1, are covered over or closed by cross-over members or plates 58, 59, respectively. Thus, the members or plates 58, 59, bridge the openings between the main or adjacent passages or ducts formed by the corrugations of the corrugated sheet 53. They thus provide end passages between the corrugations. The openings 56 which are formed in the corrugated sheet 52, combine with the binding strip 54 to form windows which the plates 58 close. See Fig. 9.

The plates 58, among themselves, vary in dimension in a way similar to the notches 56—that is, those that meet the strip more acutely have their ends which contact the strip 54 cut differently than do the cross-over plates which meet the strip at more nearly a right angle, as will be obvious. The same is true of the plates 59. In this respect, these plates differ from the plate 39 shown in Fig. 13. They are secured and sealed to the portions of the corrugated sheet 52 and strip 54, which they contact, preferably by welding. Each plate 58 is provided with an end flange 58' which is shaped to close the space which would otherwise be open around the corrugations when thus welded into place. Each plate 59 is similarly provided with an end flange 59' which likewise fits into the space between the corrugations.

Thus, the main corrugation passages are provided with two sets of passage-connecting openings in their walls. The one set, at one end, are staggered in relation to the openings at the opposite end. The staggered relation is such as to provide for a continuity of passage when the spanning plates are in place, a continuous conduit thus being provided.

In addition, the ends of the corrugations, which lie at the opposite ends of each zone, are provided with an inlet box 60 and an outlet box 61. See Figs. 1 and 4. These boxes are, in turn, connected with an inlet pipe 62 and an outlet pipe 63. These boxes are secured, preferably by welding, to the sheet 33 and to the end corrugations, in each instance.

Thus, a path for flow of the medium admitted at box 60 extends, as indicated by arrows in the several figures, through all the corrugations in series, and then out at the box 61. This path includes a single corrugation only. The structure may be varied to include two or more corrugations, as we shall see later. The bridging members and the openings between adjacent passages constitute interconnecting guiding means between said passages.

The insulation E, which lies within the outer shell A, and embraces the inner shell B, with its surrounding preformed walls C and D, constitutes a heat insulating covering for the covered parts. It may be composed of cork or other like insulating material.

The inlet connections F comprise a main supply pipe 64 which is connected with the zonal supply pipes 46, 47, 48, and with the bottom supply pipe 62. The same would be true were the bottom an end wall, as would be the case were the receptacle a horizontal receptacle instead of a vertical. These various supply pipes are controlled by valves 65, 66, 67, 68, so that any particular zone may be supplied with the medium then in use. A steam connection 69 controlled by a valve 70, and a water supply pipe 71 controlled by a valve 72, are provided at the upper end of the pipe 64. The outlet connections G include a similar waste pipe 73 which connects with the zonal waste or outlet pipes 49, 50, 51, 63. These are, respectively, controlled by valves 74, 75, 76, 77. Where steam and water are the mediums employed, as would be the case were the receptacle used as a milk pasteurizer, this pipe carries away the condensate for the steam and the waste water which is left after the cooling operation. By manipulation of the valves, any desired number of zones may be used. A valve 78 controls the waste pipe 79 which connects with the bottom of the pipe 73.

Projecting downward from the under side of the inner shell B, and piercing through the outer shell A, are feet 80, preferably four in number, which serve to support the receptacle upon the floor 81. The upper bridge 82, covers 83, 83, motor 84, and agitator shaft 85, may preferably be such as shown in our prior Patent No. 2,280,529, granted April 21, 1942, and therefore need not be further described. These features will insure easy accessibility for cleaning. The agitator shaft 85 has a bearing located at the center of the bottom 33. Projecting from the opposite sides of the lower end of the shaft 85, are agitator blades 86, 86, which revolve slightly above the bottom 33 of the shell B. This is a vertical receptacle. A horizontal one would necessarily have the feet differently located, with a corresponding change in other parts, as suggested by the prior patent to Timothy Mojonnier, No. 2,320,531, granted June 1, 1943.

It will be noted that when the receptacle is vertical, the bottom sheet of the inner shell B is given a double inclination which serves to guide the contents, for example, milk, toward the center and to one end. Thus, as shown clearly in Fig. 1, the bottom 33 is given a decided slope towards the outlet valve 86. This is a straight-line slope from the high portion, indicated at $a$ in Figs. 1 and 4, to the low portion indicated at $b$ in the same figures. In addition, the bottom 33 is given a double slope at right angles to the direction of the first slope. This double slope is indicated by the line $c$—$d$—$e$ of Fig. 8, one slope being from the high side at $c$ to the central point $d$, and the other slope being from the high side at $e$ to the central point $d$. The meeting of the two slopes is indicated by the dash line 87 in Fig. 1.

Thus, an inclined trough is formed by having the bottom sloping toward one edge and laterally thereof downward from opposite sides to its center. This insures easy drainage.

Likewise, the jacketing space formed in the bottom of the receptacle, by extending from the low portion to the high portion and having an inlet and an outlet communicating with said portions, serves to efficiently convey the heat exchange medium to the substance within the receptacle.

In addition, the bridge 82 is provided with an opening 88 for supplying the receptacle with its liquid contents. It also has two spuds 89, 89, for the insertion of thermometers.

Figures 12, 13, 14:
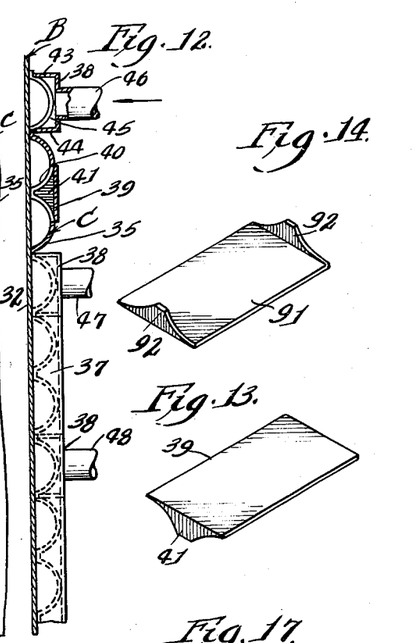
Fig. 12 is a vertical section cut through the same, the plane of section being indicated by the line 12—12 of Fig. 11.
Fig. 13 is a perspective view of one of the members used in bridging adjacent corrugations where the ends of the corrugated sheet are slitted or notched, as in Figs. 9 and 11.
Fig. 14 is a similar perspective view showing a modified bridging member such as used with the modified opening of Fig. 10.

Turning now to a slight modification of the crossover or bridging members 58, it will be possible to have all the openings of the same size. This may be accomplished, as shown in Fig. 10, by providing each preformed member with a slot 90, each slot being of the same size. The modified preformed member is designated generally D', and specifically 52', with its valleys 53'. When a bottom or end member is thus provided, it may be used with the curved wall structure of Figs. 11 and 12, thereby making all the plates and the covered openings more nearly uniform. These openings 90 may be covered by bridging members 91 which are preferably slightly larger than the openings which they cover. In Fig. 14, we show one such cross-member 91 having two flanges 92 which are shaped to fit the corrugations. Each member 91, with its flanges, fits down upon the window formed by the slot 90, and is secured in place, preferably by being welded thereto.

Figures 5, 6:
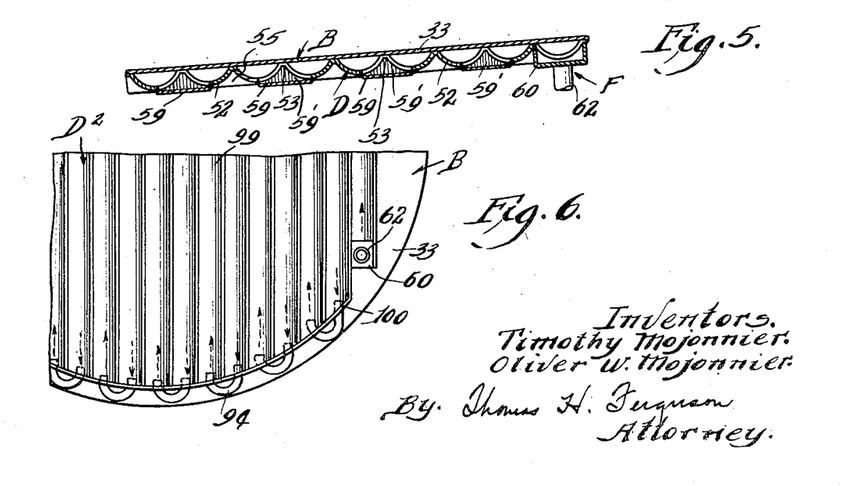
Fig. 5 is a section of a portion of the bottom structure showing the intake in place, the section being taken at right angles to the plane of the bottom plate and the plane of section indicated by the line 5—5 of Fig. 1.
Fig. 6 is an inverted view, similar to Fig. 2, illustrating a modification wherein tubular connections are used between adjacent corrugations.
Figure 7:
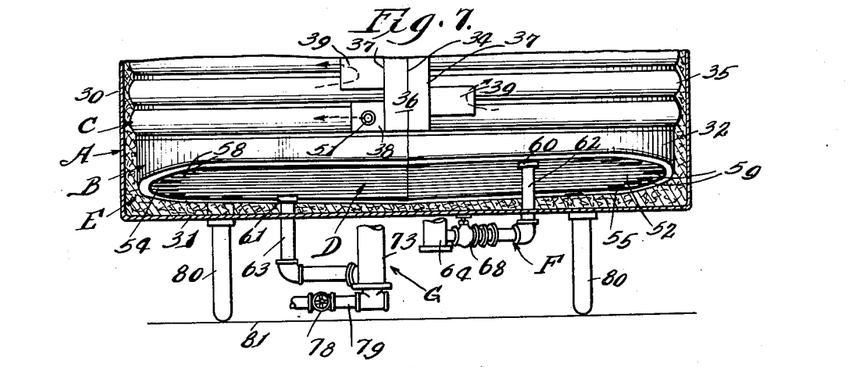
Fig. 7 is a view of a portion of the inner shell shown in elevation, and the outer shell and insulation shown in section.
Figure 15:
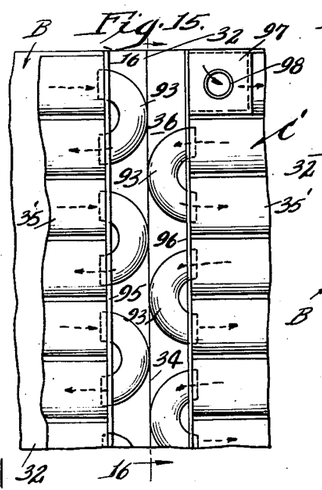
Fig. 15 is a fragmentary view of the peripheral wall provided with goose-neck connections.
Figures 16, 17:
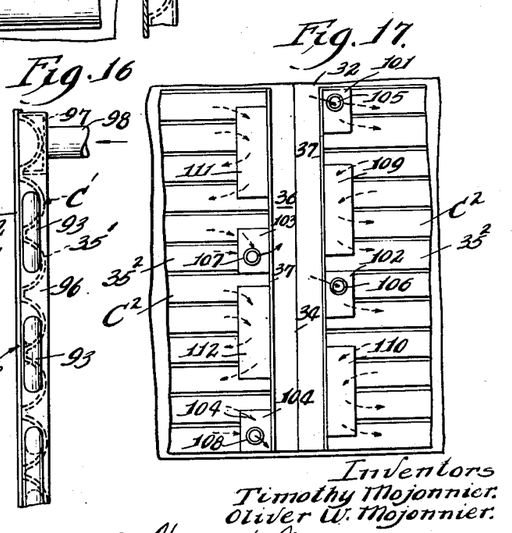
Fig. 16 is a similar vertical section through the same, indicated by the line 16—16 of Fig. 15.
Fig. 17 is a fragmentary view similar to Fig. 11, illustrating bridging members covering openings in several adjacent corrugations.

By a still further modified structure, shown in Figs. 6, 15 and 16, it is possible to employ preformed sheets C' and D², wherein successive corrugations are connected by goose-necks 93, 94. The goose-necks are staggered both in the bottom ends and the surrounding peripheral walls, and are simple U-shaped tubes or pipes.

Referring to the preformed sheet C' which is shown in Figs. 15 and 16, the goose-necks 93 are made all alike and they pierce the strips 95, 96, as illustrated. They are secured to the strips, and the strips are secured to the ends of the corrugated sheet 35' and to the base sheet 32, preferably by welding. In Figs. 15 and 16 which show a portion of the peripheral wall structure, one terminal box 97 is shown in place, connected to one terminal pipe 98. It will be apparent how the balance of the peripheral wall structure is completed. The direction of flow of the temperature modifying medium is indicated by the arrows in Fig. 15, assuming that the terminal pipe 98 is an inlet.

Turning now to the preformed sheet D², it will be understood that it is generally circular where made for a circular receptacle, the receptacle chosen for illustration. The corrugated sheet 99 is given straight-line corrugations. It is provided at its ends with strips 100, one only being shown in Fig. 6. These strips are secured edgewise to the base sheet 33 and welded to the ends of the corrugations of the corrugated sheet 99. The goose-necks 94 pierce the strip 100 and are differently shaped according to the angle at which the strip and particular corrugations meet, the same as the plate and openings in the first described structure. These goose-necks 94 are arranged in staggered relation at opposite ends of the corrugations, the same as the cross-members of the previous figures. The last corrugation is provided with a terminal box 60 and terminal pipe 62, the same as shown in Fig. 2. Assuming that the latter pipe supplies the temperature conditioning medium which flows through the interiors of the corrugations, the direction of flow will be that indicated by the arrows in Fig. 6.

In Fig. 17, we have illustrated a further modification in which the preformed sheet C² is shown mounted on a base sheet 32, and the structure is the same in general as in Fig. 11. It will be noted that the number of corrugations through which the medium flows is doubled—that is to say, the medium flows through two adjacent corrugations in the same direction, and that but two zones are provided instead of the three as heretofore, and there is, in all, twelve corrugations. The corrugated sheet $35^2$ is cut away differently at the ends than the sheet 35. In this instance, there are intake boxes 101, 102, on the right of the open space 36, which lies between the corrugations bounding strips 37, 37. At the left of the same open space, are outlet boxes 103, 104. These boxes 101, 102, 103, 104, are provided with suitable terminal pipes 105, 106, 107, 108, respectively. It will be noted that the terminal boxes span two of the corrugations of the corrugated sheet. In addition to the terminal boxes, the corrugations are spanned by plates 109, 110, at the right of the space 36, and by plates 111, 112, at the left. Each of these plates spans four of the corrugation passages, thus placing them into communication with each other. Thus, plate 109 connects (counting from the top in Fig. 17) the third, fourth, fifth and sixth corrugations. Plate 110 connects the ninth, tenth, eleventh and twelfth corrugations. The other plates 111, 122, which are in staggered relation to the plates 109, 110, connect four corrugations each, as will be obvious from the illustration. Thus, plate 111 connects the first four corrugations, and plate 112 connects the seventh, eighth, ninth and tenth corrugations. Likewise, terminal box 101 connects the first two, and plate 112 connects the seventh and eighth corrugations. Similarly, plate 103 connects the fifth and sixth corrugations, and plate 104 connects the last two. With the inlet for the top zone at box 101, and the outlet at box 103, the medium will flow in the direction of the arrows. Similarly, with the inlet at box 102 of the bottom zone, and the outlet at box 104, the flow of the medium will be as indicated by the arrows for that zone. A reversal of the connections will result in a reversal of flow, as will be obvious.

Figures 18, 19, 20, 21:
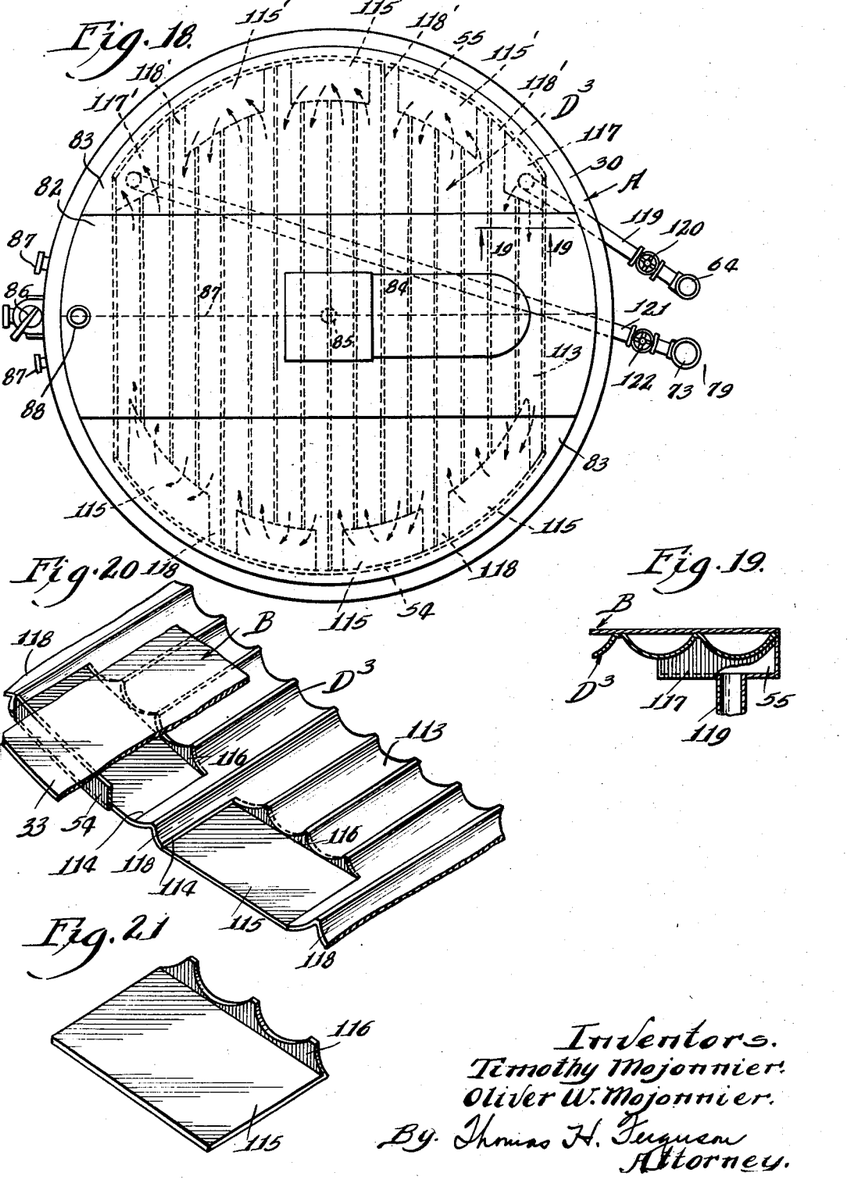
Fig. 18 is a plan view of a modified structure showing a bottom provided with bridging members covering a like plurality of corrugations.
Fig. 19 is a detailed view, partially in section, the plane of which is indicated by the line 19—19 of Fig. 18.
Fig. 20 is a fragmentary perspective view of a portion of the bottom structure of Fig. 18, showing how the parts are secured together.
Fig. 21 is a perspective view of one of the bridging members used in the structure of Fig. 20.

In the form of the invention shown in Figs. 18 to 21 inclusive, we have a modified bottom end with a differently cut preformed wall D³. According to the bottom structure, the preformed wall is a corrugated sheet 113 cut away at its ends with side notches 114, which are closed by side plates 115, 115'. Each plate 115 has one flange 116 which is scalloped to fit against or otherwise close the open ends which would otherwise be left by the corrugations. The plates 115 in this case are made wide enough to span or bridge four corrugations and thus provide end passages between the corrugations in sets of four. The plates 115' at the opposite ends of the corrugated sheet 113 are staggered in relation to the plates 115, as illustrated. The structure is also provided with terminal boxes 117, 117', which span two corrugations each. One of the flanges of each box 117, 117' is scalloped to fit the adjacent corrugation, which, like the short corrugations of Fig. 20, are cut off and thus provide clear openings from the corrugations into the box.

The long portions 118, 118' of the preformed member D³ extend to the outer limit of that member, and the outer edges of the end passages are closed by the bounding strip 54 or 55 as the case may be. This is shown, in respect to the strip 54, in Fig. 20 where the strip, which is secured to the base sheet 33 and to the ends of the portion 118, thus completing one of the previously mentioned end passages. The strip 55 also constitutes one wall of each terminal box 117, 117', as well as one side of each of the end passages. From the inlet terminal box 117, projects an inlet pipe 119 which also extends laterally to the supply pipe 64. It is controlled by a manual valve 120. A similar pipe 121, a waste pipe, leads from the other terminal box 117' downward and laterally to the waste pipe 73. It is also controlled by a valve 122. The direction of flow through the passages is indicated by the arrows in Fig. 18. These pipes may be reversely connected, the intake becoming the outlet, and the outlet becoming the intake, as will be obvious.

It will be noted that the shapes of the members 115, 115' will vary, due to the angles existing between the corrugations and the end strips 54, 55, as pointed out in connection with the preceding figure. They should, in this instance, be shaped to conform more exactly to their form in the accompanying drawings.

If the bottom end structure of Fig. 18 is to be used as a refrigerating coil and the other coils of the structure to be used for heating or cooling with water, then the pipes 119 and 121 are to be separately connected with the source of the particular refrigerant. Or, such different connections might even be used without such differences in refrigerating means, all as desired by the designer or the initial user.

Coming now to a consideration of the structure of another modification, in which the preformed wall is arranged for the flow of the medium from a low to a high point as quickly as possible, we turn to the structures of Figs. 22 to 25 inclusive. In this form the same wall structure may be employed as previously, but a different preformed bottom or end wall $D^4$ or $D^5$ is used.

Figure 22:
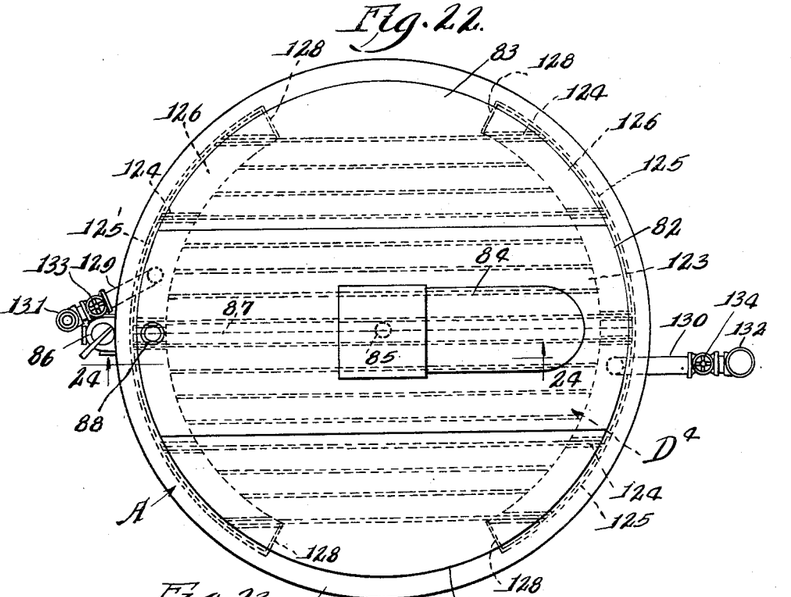
Fig. 22 is a plan view similar to Fig. 1, showing the bottom corrugations arranged at right angles to their position in Fig. 1.
Figures 26, 27, 28, 29:
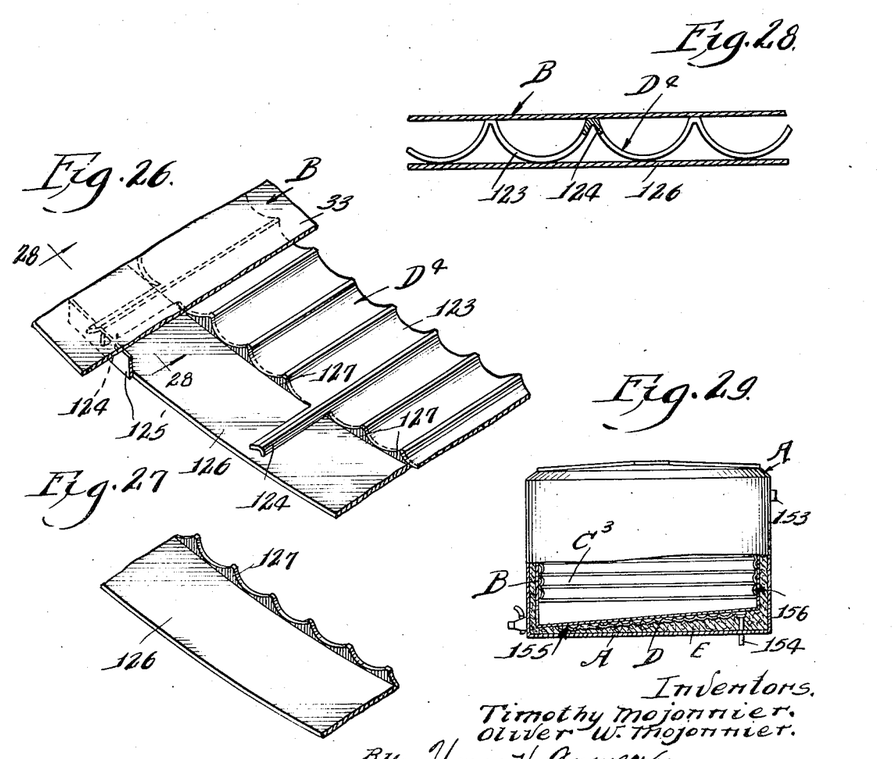
Fig. 26 is a fragmentary perspective view, illustrating the base sheet and the corrugations attached thereto, according to the form of the invention shown in Figs. 22 and 23.
Fig. 27 is a perspective view of a portion of the bridging member used in the structure of Fig. 26.
Fig. 28 is a detailed section of the structure of Fig. 26, the plane of section being indicated by the line 28—28 of Fig. 26.
Fig. 29 is a small view of a receptacle showing the corrugations of the side wall on the inside of the receptacle, parts being broken away and parts shown in section.

In the case of the structure of Fig. 22, employing the preformed wall $D^4$, the details of Fig. 26 show the preformed wall which is a corrugated wall 123, with extended ends 124, which are somewhat like the projections 118, 118' of the form of the invention shown in Fig. 20, but not so thick or deep; no portion thereof reaching far enough to block, in any way, the end passages formed by the strips 125, 125', and plates 126. Each of the plates 126 (see Figs. 26, 27 and 28) by its scalloped flange 127 fits upon the corrugations. The strips 125, 125' are outstanding from the base plate 33 and each is secured thereto by being welded. Each plate 126 is also secured to the ends 124, being preferably welded thereto. When secured in place, there is a long end passage at each end of the preformed wall, extending the full length of the plate 126. The plates 126 are closed at their ends by flanges or turned-up ends 128, which are welded or otherwise secured, a tight joint being formed all around.

With this structure, for the end passages, it will be apparent that all the left-hand ends of the corrugations, as viewed in Fig. 22, are connected by a broad passage; likewise, all the right-hand ends. Consequently, a single inlet connection 129, and a single outlet connection 130, serves to connect the inlet with the supply pipe 131 and the outlet with the waste pipe 132. These are preferably controlled by valves 133 and 134, respectively. A supply box 135 serves to establish connection between the connecting pipe 129 and the end channel connecting with all the lower ends of the corrugations of the preformed wall $D^4$. A similar box 136 (see Fig. 25) will serve at the outlet 130.

The bottom plate 33 is inclined as before. It now connects the low inlet 129 to the high outlet 130. The intake and outlet are preferably connected independently to the supply source of the refrigerant, the inlet receiving the liquid, and the outlet passing the gas back to the compressor, as is common in refrigerating apparatus.

The wall structure of the receptacle may be supplied with a heating medium such as steam, and a cooling medium such as cooling water. The extra coil may be used to supply a refrigerant for cooling to a lower temperature. When hot water for heating, or cold water for cooling, is supplied, the water in either case may be introduced at the bottom header. It is thus possible to completely fill all the passageways.

Figure 23:
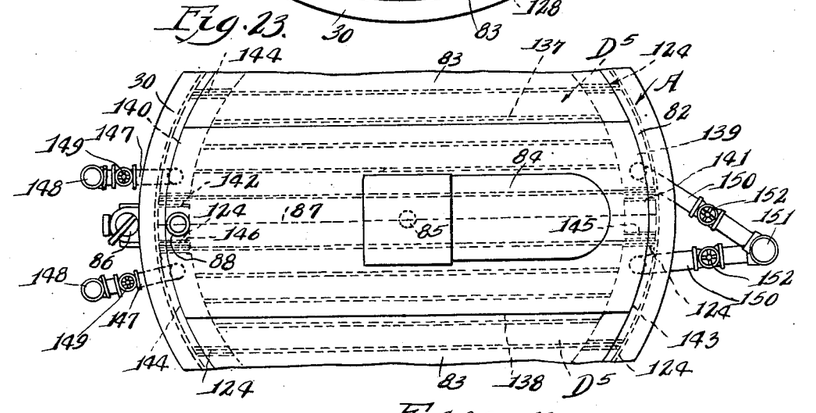
Figure 24:
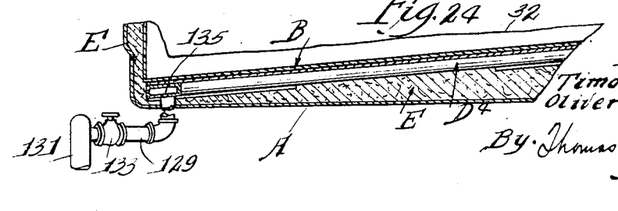
Fig. 24 is a vertical section of a fragment of the lower portion of the receptacle, the plane of section being indicated by the line 24—24 of Fig. 22.
Figure 25:
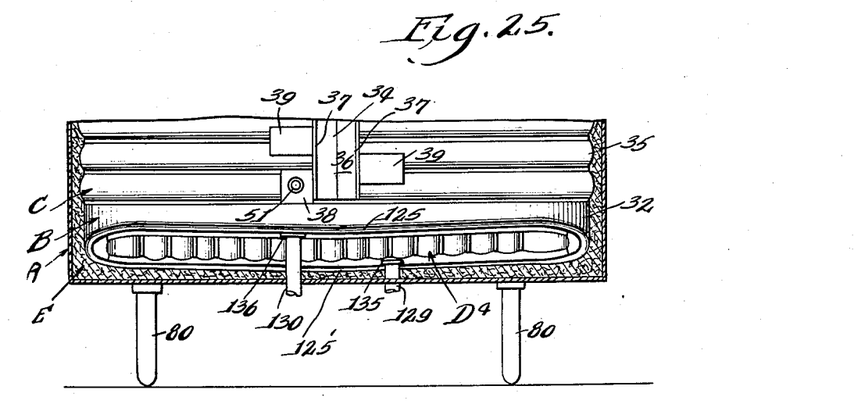
Fig. 25 is a view similar to Fig. 7, showing the corrugations extending at right angles to their direction in Fig. 1.

Turning now to the preformed wall $D^5$, shown in Fig. 23, it will be noted that the structure and connections are in general the same as in the arrangement of Fig. 22, except that the wall $D^5$ is divided into two zones 137, 138. The ends of the corrugations of zone 137 are connected by end plates 139, 140. These are the same as the plates 126 of the structure of Fig. 22, except that they are shorter and provided with end flanges or plates 141, 142, which close the ends of the inner end passages. The ends of the corrugations of zone 138 are connected by similar plates 143, 144, provided with flanges 145, 146. The inlet pipes 147, 147, are connected with the supply pipes 148, 148, and controlled by valves 149, 149. At the outlet end, each outlet 150 is connected to a pipe 151. The valves 152, 152, control the pipes 150, 150. What was said about the arrangement of Fig. 22 applies equally well here, except that in the case of the two zones 137, 138 may be individually connected and hence a less degree of refrigeration is made possible, other things being equal.

An obvious modification, and one which might under some circumstances be employed, is that shown in Fig. 29, wherein the corrugations are placed on the inside of the receptacle. Thus, the inner shell B and outside shell A are separated in the wall structure, and insulation E fills the intervening space. The preformed wall $C^3$ is located on the inside of the wall of the shell, and the preformed wall D is located on the outside of the bottom. The terminals are indicated in two instances, one being at 153, and the other at 154. In those cases where the section does not cut through the terminals, their equivalent location is indicated by arrows, one being arrow 155, and the other arrow 156. The insulation E is located within the shell A and directly contacts a portion of the shell B where the preformed wall $C^3$ is within the shell, and where the preformed wall D is without the shell, the insulation engages the preformed wall. With the arrangement shown, any medium may be employed. It is shown as adapted for a quick-cooling pasteurizer by which steam is at first admitted by inlet 153, and the condensate flows out as indicated by the arrow 156. Then, after heating the contents of the receptacle, the steam is cut off and cooling water is applied to the container by admitting it at inlet 153 and withdrawing it after it has cooled the contents as much as it can. Then, ammonia or a like refrigerant is supplied as a liquid to the inlet indicated by the arrow 155, and then withdrawn as a gas from the outlet 154. The ammonia gas is then compressed and cooled, and the cycle repeated as is well known in such refrigerating equipment.

Indeed, the refrigerating coil may be the only coil upon the receptacle. By using ammonia or the like as a refrigerant in the coil, it will be possible to quickly cool the contents. Such cooling of milk, right after milking, has been found very useful in preventing contamination of the milk.

Obviously, the shape of the receptacle may be varied. It may be in section elliptical, square, oblong, or the like. It may also be composed of various substances, such as stainless steel, Monel metal and the like.

Although it has been necessary to exaggerate some of the dimensions, particularly the thickness of the material, it is to be understood that, ordinarily, the principal material will be sheet metal of the stainless variety, having a gauge preferably of 14 or 16, United States Standard Revised. This may be varied in accordance with the judgment of the designer.

It will also be apparent from what has been said that the preformed sheet need not be a corrugated sheet such as shown, but may be differently formed.

It will also be understood that the intervening space 36 may vary greatly. Indeed, in certain instances, it may include the greater part of the circumference of the container, the balance being taken up by the jacket. The temperature-controlling jacket has openings on opposite sides of the intervening space. In the preferred form, the passages extend around the curved wall of the shell and partially enclose the same, leaving only the intervening space unenclosed by them.

It will be understood that the invention may be variously used for heating or cooling, with water, steam, ammonia, or other heating and refrigerating substances.

The form of the receptacle need not be limited to a vertical construction, since the same may be horizontal or inclined as desired. When horizontal, the same bottom construction heretofore described need not be employed.

Likewise, the invention may be used with hot or cold wall tanks, vats, or like receptacles. It is understood that in some arts the term "tanks" is used to apply to containers that cool and store only, and "vats" to containers used in processing operations which involve both heating and cooling.

It will be observed, too, that the various constructions, indicated in this disclosure, are capable of a highly efficient heat transfer. This is due to the fact that the substance being treated is brought into intimate contact with the temperature conditioning element, whether to heat or to cool, and that such intimacy is promoted by means of the agitation within the receptacle. Ordinarily, in the dairy industry, there is an increase of about fifty percent in this heat transfer over similar heating and cooling devices in use.

Still other alterations and modifications may be made in the particular structure shown, and the uses to which the invention may be applied, without departing from the spirit and scope of the invention. Accordingly, we do not wish to be limited to the exact embodiments herein disclosed, but aim to cover by the terms of the appended claims all such alterations and modifications as directly come within the scope and spirit of the invention.

We claim:

1. In a receptacle of the class described, the combination of a sheet metal shell, a corrugated metal wall secured to said shell along its valleys thus providing a series of generally independent parallel fluid ducts between the shell and the wall corrugations, an elongated metal strip at each end of said series secured and sealed along one longitudinal edge to said shell and at other points to the corrugation ends, said strips lying wholly on one side of said shell and having a depth substantially equal to that of said corrugations, the corrugated wall being apertured near each strip, each aperture being formed by cutting along the tops of two corrugation ridges in said wall a substantial distance inwardly from the strip and across from one cut ridge to the other, and bridging members secured and sealed to the margins of said apertures and to the other longitudinal edge of said strips forming with the strips and shell transverse end passages for the flow of fluid between adjoining ducts so apertured.

2. In a receptacle of the class described, the combination of a sheet metal shell, a corrugated metal wall secured to said shell along its valleys thus providing a series of generally independent parallel fluid ducts between the shell and the wall corrugations, an elongated metal strip at each end of said series secured and sealed along one longitudinal edge to said shell and at other points to the corrugation ends, said strips lying wholly on one side of said shell and having a depth substantially equal to that of said corrugations, the corrugated wall being apertured near each strip, each aperture being formed by cutting along the tops of two corrugation ridges of said wall a substantial distance inwardly from the strip and across from one cut ridge to the other, and bridging members secured and sealed to the margins of said apertures and to the margin of said strips and having their outer surfaces flush with the tops of the ridges of the corrugations of said wall forming with the strips and said shell transverse passages for the flow of fluid between adjoining ducts so apertured.

3. In a receptacle of the class described, the combination of a sheet metal shell, a corrugated metal wall welded to said shell along its valleys thus providing a series of generally independent parallel fluid ducts between the shell and wall, a metal strip positioned at each end of said passages welded to the corrugation ends, said strips lying wholly on one side of the shell and having a depth substantially equal to that of said corrugations, the corrugated wall having a plurality of apertures adjoining said strips, those apertures at one end of said corrugated wall being staggered with reference to those at the other end, said apertures each being cut through the ridge portions of adjoining corrugations in said wall for establishing communication between adjoining ducts near their end portions, and bridging plates welded to the margins of said apertures and to said strips forming with the strips and said shell sealed transverse passages for confining the flow of fluid between adjoining parallel ducts.

4. In a receptacle of the class described, the combination of a sheet metal shell, a corrugated metal wall secured to said shell along its valleys thus providing a series of generally independent parallel fluid ducts between the shell and the wall corrugations, an elongated metal strip at each end of said series secured and sealed along one longitudinal edge to said shell and at other points to the corrugation ends, said strips lying wholly on one side of said shell and having a depth substantially equal to that of said corrugations, the corrugated wall being apertured near each strip, each aperture being formed by parallel cuts extending lengthwise through the top portions of two corrugation ridges in said wall with the intervening valley portions of said corrugations between said parallel cuts being removed to expose the ends of the cut parallel ducts, and bridging members overlying said apertures and sealed in place with their outer surfaces substantially flush with the tops of the ridges of the corrugations, to complete end passages between said exposed duct ends and to cooperate with said elongated strips and said shell to confine the flow of fluid between and through said parallel ducts.

5. In a receptacle of the class described, the combination of a sheet metal shell, a corrugated metal wall welded to said shell along its valleys thus providing a series of generally independent parallel fluid ducts between the shell and wall, a metal strip positioned at each end of said passages welded to the corrugation ends, said strips lying wholly on one side of the shell and having a depth substantially equal to that of said corrugations, the corrugated wall having a plurality of apertures adjoining said strips, those apertures at one end of said corrugated wall being staggered with reference to those at the other end, said apertures each being formed by parallel cuts extending lengthwise through the top portions of two corrugation ridges in said wall with the intervening valley portions of said corrugations between said parallel cuts being removed to expose the ends of the cut parallel ducts, and bridging plates overlying said apertures and welded in place to complete end passages between said exposed duct ends and to cooperate with said elongated strips and said shell to confine the flow of fluid between and through the parallel ducts.

TIMOTHY MOJONNIER.
OLIVER W. MOJONNIER.

REFERENCES CITED

The following references are of record in the file of this patent:

UNITED STATES PATENTS

| Number | Name | Date |
|---|---|---|
| 1,545,893 | Gregory | July 14, 1925 |
| 2,277,526 | Mojonnier et al. | Mar. 24, 1942 |
| 2,320,531 | Mojonnier | June 1, 1943 |

FOREIGN PATENTS

| Number | Country | Date |
|---|---|---|
| 673,843 | Germany | Mar. 30, 1939 |